United States Patent Office 3,408,378
Patented Oct. 29, 1968

3,408,378
ORGANOALUMINUM COMPOUNDS AND
PROCESS FOR PREPARATION
Donald L. Schmidt, Midland, Mich., assignor to The Dow Chemical Company, Midland, Mich., a corporation of Delaware
No Drawing. Filed Apr. 8, 1965, Ser. No. 446,690
5 Claims. (Cl. 260—448)

ABSTRACT OF THE DISCLOSURE

The invention is to the compound Δ-5,5′(2H,2′H)-bi-1,3,2-diazoaluminine and to a method of its preparation by reacting a solvated aluminum hydride, preferably as a diethyl ether solution, with tetracyanoethylene in an ether solvent.

---

This invention relates to novel compositions of matter having metal atoms bonded with nitrogen atoms in aromatic organic structures and more particularly is concerned with novel compositions of nitrogen containing organic aromatic molecules bonded with aluminum wherein the aluminum is incorporated into the organic molecule through nitrile radicals.

One novel embodiment of the composition of the present invention is Δ - 5,5′(2H,2′H) - bi - 1,3,2 - diazoaluminine corresponding to the empirical formula $Al_2C_6H_6N_4$ and the structural Formula I, which follows:

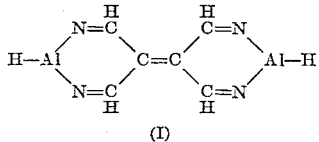

(I)

The novel compounds of the present invention are solids which show no noticeable degradation or change when heated for extended periods of time at reduced pressures in an inert atmosphere. They undergo spontaneous reaction with oxygen when exposed to air to provide a reaction product which is unreactive both with dilute acids and bases. Carbon dioxide also adds to the present novel compounds.

The novel metal-nitrogen containing aromatic organic compounds of the present invention find utility as conductors of electricity. These also serve as monomers for preparing polymers having high thermal stability.

The novel compounds of the present invention readily are prepared by reaction of dinitriles or nitriles having more than 2 cyano groups, such as tetracyanoethylene and 7,7,8,8-tetracyanoquinodimethane corresponding to the formula

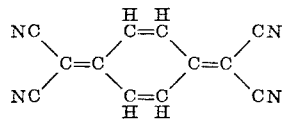

as taught by Acker et al. U.S. Patent 3,115,506, for example with metal hydrides, e.g. ether solvated aluminum hydride, boron hydride and the like, preferably in an inert solvent.

The Δ-5,5′(2H,2′H) - bi - 1,3,2-diazoaluminine compound is prepared by reacting a solvated aluminum hydride, preferably as a diethyl ether solution, with tetracyanoethylene in an ether solvent.

The preparation of the novel compounds ordinarily is carried out in an inert, substantially anhydrous atmosphere, e.g. nitrogen or argon, at a temperature of from about minus 70 to about positive 50° C., preferably at about room temperature, i.e. about 18–30° C., in the presence of an inert ether solvent for the reactants, such as diethyl ether, n-dipropyl ether, iso-dipropyl ether, tetrahydrofuran and the like.

The solvents listed are particularly useful since when these are employed, the metal-aromatic organic product compound, as formed, precipitates directly in the reaction medium, and readily is removed therefrom.

The actual preparation of the present novel compounds ordinarily is carried out by agitating an ethereal solution of the reactants. Conveniently one of the reactants in solution is added slowly to a stirred solution of the second reactant over a period of time, the product precipitating directly in the reaction mass. Usually, to assure completion of the reaction, the reaction mixture is stirred or agitated for an additional period of time, e.g. from several minutes up to an hour or more following the completion of mixing of the reactants.

Quantities of reactants employed are such that there are from about 1 to about 3, preferably about 2, cyano groups present for each metal atom of the metal hydride reactant.

The solution concentrations to be used are not critical. Maximum concentrations ordinarily are those such that the reactant is completely dissolved therein at the operating conditions. Extremely dilute solutions are somewhat undesirable in that they are unwieldy to handle, require large storage and processing equipment and can make the separation of the solid product a time consuming operation. For most operations, reactant solutions ranging in concentration from about 0.01 to about 0.1 molar with respect to the reactant solutes are used.

For optimum product yield and purity, all processing operations, including the initial solution preparation, are carried out in a substantially anhydrous, inert atmosphere, e.g. nitrogen or argon. Also, all reactants and solvents preferably are dried so as to be substantially anhydrous prior to use in the process.

The following examples will serve to further illustrate the present invention but are not meant to limit it thereto.

EXAMPLE 1

A solution of 2.56 grams (0.014 gram mole) of tetracyanoethylene in 500 cubic centimeters of substantially anhydrous diethyl ether was slowly added over a period of about one hour at room temperature (29° C.) to a magnetically stirred substantially anhydrous diethyl ether solution of aluminum hydride consisting of about 0.8 grams (0.028 gram mole) of aluminum hydride in 500 cubic centimeters of the ether. During the mixing of the reactants, there was no measurable evolution of gas detected.

As the reactants mixed upon contact of the solutions, a solid yellow product precipitated in the reaction mass. This was separated from the residual liquid under a substantially anhydrous nitrogen atmosphere. The resulting solid product was washed three times with anhydrous diethyl ether and dried at a reduced pressure of about 0.01 millimeter mercury absolute for about 16 hours. Product recovery was about 3.2 grams.

The ethereal aluminum hydride solution was prepared by known art techniques; i.e. reacting aluminum chloride with lithium aluminum hydride in substantially anhydrous diethyl ether, and filtering off the precipitated lithium chloride and other insolubles. The resulting ethereal aluminum hydride product solution was used directly in the instant preparation.

Chemical elemental analysis of the product gave Al, 28.69%, C, 38.31%. Theoretical values for aluminum and carbon in Δ-5,5′(2H,2′H)-bi-1,3,2-diazoaluminine $(Al_2C_6H_6N_4)$ are aluminum 28.73%; carbon, 37.35%.

Infrared analysis of the product showed a very strong absorption band at 4.65μ apparently indicative of the presence of large quantities of the complex

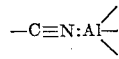

A band at 5.51μ was evidence of Al-H stretching. Absorption in the region of 6.7μ shows an "imine" linkage

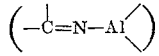

This spectrum is characteristic of a compound formed from the addition of two aluminum hydride molecules with two of the nitrile groups of the tetracyanoethylene molecule and the subsequent complexing of the remaining nitrile groups with the —AlH₂ groupings. This structure supports the structural Formula I, presented hereinbefore.

A sample of the solid yellow product was exposed to carbon dioxide in a dry box for about ten minutes. Chemical elemental analysis of the resulting solid gave C, 34.61%, N, 18.43%. The calculated analysis for the carbon dioxide addition compound of the present product corresponding to the empirical formula

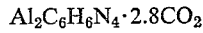

is C, 33.98%; N, 18.10%.

A one gram sample of the original product was slowly exposed to air by slightly loosening the cap of the bottle in which the sample was kept and allowing the bottle to stand in the air for seven days. During this exposure time, the product slowly changed from yellow to brown-black in color. The resulting material gave no evidence of reaction either with dilute mineral acid and dilute bases.

EXAMPLE 2

To an agitated solution of tetracyanoethylene, 0.039 gram mole, dissolved in 500 cubic centimeters of tetrahydrofuran and cooled to Dry Ice temperature was slowly added 500 cubic centimeters of a solution of 0.078 gram mole aluminum hydride dissolved in tetrahydrofuran. A yellow precipitate, 1.3 grams, formed as the resulting solution was warmed to room temperature following completion of the aluminum hydride addition. The solid product was recovered and dried at room temperature under a reduced pressure of about 0.01 millimeter mercury absolute.

Chemical elemental analysis of the product showed Al, 25.32%; C, 41.64%. Calculated elemental analysis for $Al_2C_6H_6N_4 \cdot 0.35(C_4H_8O)$ gave Al, 25.32%; C, 41.33%.

A thermogravimetric study, run under nitrogen, indicated the compound lost about 30% of its weight at about 350° C. Continued heating of the product at about 500° C. for an hour showed an additional weight loss of only about one percent.

Infrared spectrum showed the presence of tetrahydrofuran. Bands at 4.39μ and 4.69μ are attributed to —C≡N stretching and the presence of the complex

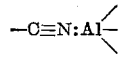

A band at 5.51μ resulted from Al-H stretching and a strong band in the region of 6.7μ was indicative of

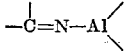

grouping. These analytical data further support the compound as being the tetrahydrofuran etherate of Δ-5,5'-(2H,2'H)-bi-1,3,2-diazoaluminine.

Various modifications can be made in the present invention without departing from the spirit or scope thereof for it is understood that I limit myself only as defined in the appended claims.

I claim:
1. Δ-5,5'(2H,2'H)-bi-1,3,2-diazoaluminine.
2. A process for preparing Δ-5,5'(2H,2'H)-bi-1,3,2-diazoaluminine which comprises contacting tetracyanoethylene and a solvated aluminum hydride in an inert solvent, agitating said tetracyanoethylene and said solvated aluminum hydride reaction mixture at a temperature of from about minus 70 to about positive 50° C., precipitating said Δ-5,5'(2H,2'H)-bi-1,3,2-diazoaluminine in the reaction mixture and recovering said Δ-5,5'(2H,2'H)-bi-1,3,2-diazoaluminine.
3. The process as defined in claim 2 wherein the inert solvent is a member selected from the group consisting of diethyl ether, n-dipropyl ether, iso-dipropyl ether and tetrahydrofuran.
4. The process as defined in claim 2 wherein the quantities of tetracyanoethylene and solvated aluminum hydride reactants are such to provide from about 1 to 3 cyano groups for each aluminum atom.
5. The process as defined in claim 2 wherein the tetracyanoethylene and solvated aluminum hydride reactants are employed as diethyl ether solutions, said solutions being mixed with agitation while being maintained at about room temperature, the quantities of said tetracyanoethylene and said solvated aluminum hydride being such that there is about 2 cyano groups present for each aluminum atom.

References Cited
UNITED STATES PATENTS

| 3,162,641 | 12/1964 | Acker | 260—285 XR |
| 3,222,385 | 12/1965 | Weissman | 260—448 XR |
| 3,267,115 | 8/1966 | Katon | 260—448 XR |
| 3,297,743 | 1/1967 | Blanchard | 260—448 XR |

TOBIAS E. LEVOW, *Primary Examiner.*

H. M. S. SNEED, *Assistant Examiner.*